(12) United States Patent
Boyer et al.

(10) Patent No.: US 7,278,276 B2
(45) Date of Patent: Oct. 9, 2007

(54) FROZEN CARBONATED BEVERAGE APPARATUS FOR PREPARING A LOW BRIX FROZEN CARBONATED BEVERAGE

(75) Inventors: George Charles Boyer, Rockton, IL (US); Martin Anthony Pateros, Janesville, WI (US)

(73) Assignee: Carrier Commercial Refrigeration, Inc., Charlotte, NC (US)

( * ) Notice: Subject to any disclaimer, the term of this patent is extended or adjusted under 35 U.S.C. 154(b) by 74 days.

(21) Appl. No.: 10/956,317

(22) Filed: Oct. 1, 2004

(65) Prior Publication Data

US 2006/0070394 A1 Apr. 6, 2006

(51) Int. Cl.
*A23G 9/12* (2006.01)
(52) U.S. Cl. .................... 62/343; 366/309; 366/320
(58) Field of Classification Search .............. 62/342, 62/343; 366/147, 309, 320, 325.7, 302, 307
See application file for complete search history.

(56) References Cited

U.S. PATENT DOCUMENTS 2,027,203 A * 1/1936 Schneider .................. 366/312
3,641,783 A * 2/1972 Werner ....................... 62/343
4,241,590 A * 12/1980 Martineau ................... 62/343
4,698,984 A * 10/1987 Manfroni .................... 62/343
5,201,861 A * 4/1993 Menzel ....................... 62/135
5,312,184 A * 5/1994 Cocchi ....................... 366/302
2004/0187514 A1  9/2004 Franck et al.

OTHER PUBLICATIONS

International Search Report dated Aug. 25, 2006.

* cited by examiner

*Primary Examiner*—William E. Tapolcai
(74) *Attorney, Agent, or Firm*—Carlson, Gaskey & Olds

(57) ABSTRACT

A frozen carbonated beverage apparatus includes a freezing cylinder that stores and freezes a low Brix frozen carbonated beverage. A beater including a helical member is moveable about an axis, and a stationary baffle is received within the beater. As the beater rotates, a scraper blade scrapes against the wall of the freezing cylinder to remove any frozen product from the wall. The helical member moves the frozen product within the freezing cylinder. The baffle prevents the mass of the product from collecting in the center of the helical beater and just rotating with the beater, assisting the blending of the frozen carbonated beverage and increasing the quality of the final product.

23 Claims, 2 Drawing Sheets

FROZEN CARBONATED BEVERAGE APPARATUS FOR PREPARING A LOW BRIX FROZEN CARBONATED BEVERAGE

BACKGROUND OF THE INVENTION

The present invention relates generally to a frozen beverage apparatus that prepares low Brix beverages, such as diet frozen carbonated beverages.

A frozen carbonated beverage apparatus makes frozen carbonated beverages, hereinafter referred to as a frozen carbonated beverage (FCB). Typical frozen carbonated beverages measure approximately 12-14 Brix. Low Brix beverages, such as diet frozen carbonated beverages, typically measure approximately 4-5 Brix. The freezing characteristics of a lower Brix frozen carbonated beverage approach the freezing characteristics of water, which changes from a liquid to a solid at a constant temperature of 32° F.

Diet frozen carbonated beverages have a finished product temperature of approximately 28 to 29° F., and typical frozen carbonated beverages have a lower finished product temperature of approximately 24 to 28° F. As the finished product temperature decreases, the freezing process becomes more gradual and easier to control. Diet frozen carbonated beverages have a higher finished product temperature, and therefore the freezing process is less gradual and harder to control.

Another drawback to low Brix frozen carbonated beverages is that the product in the freezing cylinder of the prior art apparatus does not appear to remain in solution as easily as typical frozen carbonated beverages. The liquid in the freezing cylinder may separate and freeze to the beater after residing in the freezing cylinder for an extended amount of time. The solid frozen carbonated beverage would then rotate with the beater and not get mixed with the remaining or fresh product. This can lead to wide fluctuations in the Brix of the dispensed product. Also, once this occurs, the viscosity control mechanism for the frozen carbonated beverage apparatus may not sense the load of the beater moving through the frozen carbonated beverage, but may be sensing the load caused by the rotation of the solid frozen carbonate beverage. This load is typically less than the viscosity control point, and refrigeration would continue, potentially making this condition worse.

Hence, there is a need in the art for a frozen carbonated beverage apparatus that creates low Brix frozen carbonated beverages and that overcomes the shortcomings and drawbacks of the prior art.

SUMMARY OF THE INVENTION

A frozen carbonated beverage apparatus includes a freezing cylinder that stores and freezes a low Brix frozen carbonated beverage. A beater mixes the low Brix frozen carbonated beverage in the freezing cylinder to form a low Brix frozen carbonated beverage product. The beater includes a helical member that is rotatable about an axis. The helical member is supported by bars that are substantially parallel to the axis. As the beater rotates about the axis, scrapper blades rotate with the beater and scrape against an inner wall of the freezing cylinder to remove any frozen product. The helical member helps circulate the frozen carbonated beverage within the freezing cylinder.

A baffle is disposed along the axis within the beater. The baffle is stationary relative to the beater and the freezing cylinder. In one example, the baffle includes a central bar and a plurality of arms spaced from the central bar.

As the beater rotates, the frozen carbonated beverage tends to move forward along the perimeter of the freezing cylinder and then back through the center of the beater. The frozen carbonated beverage also tends to move around the axis. The stationary baffle prevents the mass of the product from just rotating with the beater and assists in blending the frozen carbonated beverage. The stationary baffle breaks up the frozen carbonated beverage as it moves within the freezing cylinder, increasing the consistency of the blended product. This prevents the frozen carbonated beverage from simply collecting along the axis and freezing within the beater, thus increasing the quality of blended product.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 4 schematically illustrates the beater and baffle of the frozen carbonated beverage apparatus.

DETAILED DESCRIPTION OF THE PREFERRED EMBODIMENT

Figure 1:
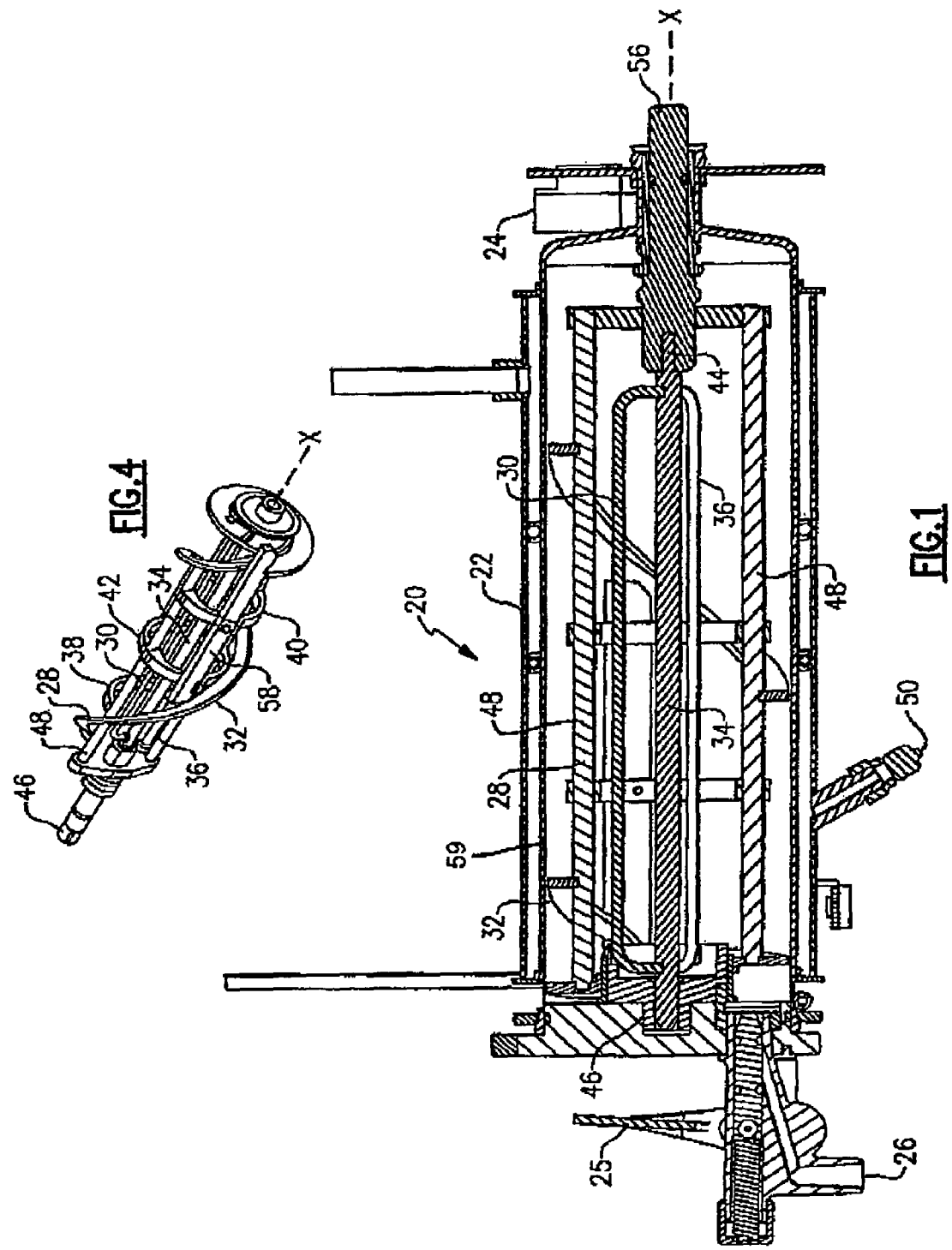
FIG. 1 schematically illustrates a frozen carbonated beverage apparatus of the present invention.

FIG. 1 schematically illustrates the frozen carbonated beverage apparatus 20 of the present invention. The frozen carbonated beverage apparatus 20 includes a freezing cylinder 22 that stores and freezes a low Brix frozen carbonated beverage. The freezing cylinder 22 is cooled by a refrigeration system, as known. A low Brix carbonated liquid solution enters the freezing cylinder 22 through an inlet 24 and is frozen and mixed in the freezing cylinder 22 to form a low Brix frozen carbonated beverage product. Carbon dioxide enters the freezing cylinder 22 through a carbon dioxide inlet 50 and mixes with the low Brix frozen carbonated beverage. The amount of carbon dioxide is controlled. The low Brix frozen carbonated beverage product is then dispensed through an outlet 26 for serving. An operator can pull a handle 25 to dispense the low Brix frozen carbonated product from the frozen carbonated beverage apparatus 20.

A low Brix frozen carbonated beverage includes a reduced amount of sugar or sugar substitute as compared to a non-low Brix frozen carbonated beverage. Therefore, during the freezing process, the low Brix frozen carbonated beverage has an increased finished product temperature and may tend to freeze within the freezing cylinder 22 and form a solid block of frozen product. The frozen carbonated beverage apparatus 20 of the present invention mixes the frozen carbonated beverage in the freezing cylinder 22 and prevents freezing from occurring.

Figure 2:
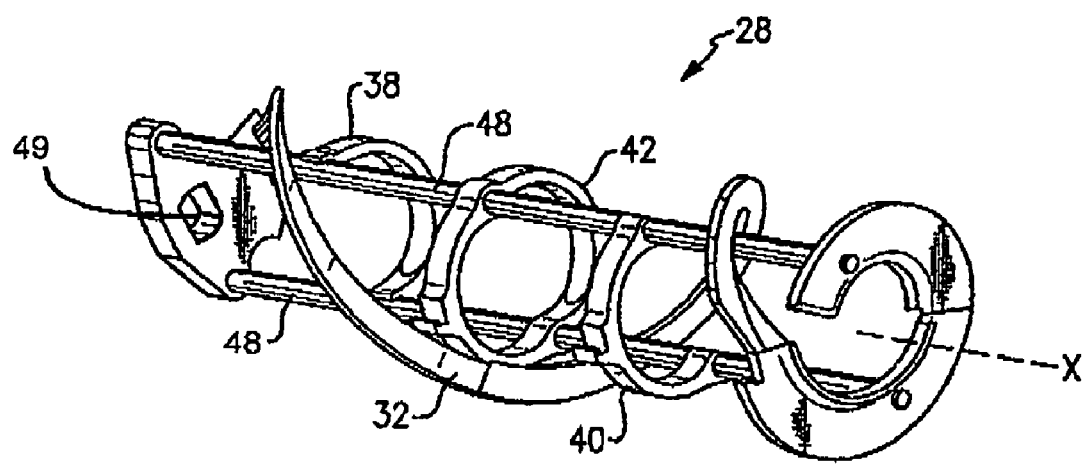
FIG. 2 schematically illustrates an example of a beater of the frozen carbonated beverage apparatus.

As further shown in FIG. 2, the frozen carbonated beverage apparatus 20 includes a beater 28 having a helical member 32 that is moveable about an axis X. The helical member 32 is supported by two bars 48 that are each substantially parallel to the axis X. In one example, several supports 38, 40 and 42 also support the helical member 32.

In one example, the outer supports 38 and 40 are semicircular in shape, and the inner support 42 is circular in shape. Preferably the outer support 38 is located on a side of the beater 28 opposite to the outer support 40. Although two bars 48 and the supports 38, 40 and 42 are illustrated and described, it is to be understood that the helical member 32 can be supported by other supports. The beater 28 also includes a drive shaft 56 (shown in FIG. 1) that rotates the beater 28 about the axis X.

The beater 28 also includes scraper blades 58 that are attached to the beater 28. The scraper blades 58 rotate with the beater 28 to remove any product on the inner wall of the freezing cylinder 22.

Figure 3:
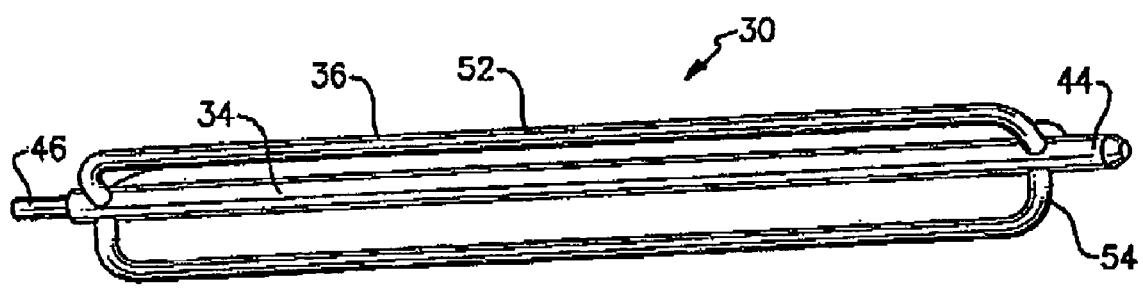
FIG. 3 schematically illustrates an example of a baffle of the frozen carbonated beverage apparatus.

As shown in FIG. 3, the frozen carbonated beverage apparatus 20 also includes a baffle 30 that extends along the axis X. The baffle 30 is stationary relative to the beater 28 and the freezing cylinder 22. In one example, the baffle 30 includes a central bar 34 and a plurality of arms 36 spaced from the central bar 34. In one example, the baffle 30 includes three arms 36. Although three arms 36 are illustrated and described, it is to be understood that any number of arms 36 can be employed. Each arm 36 includes a body portion 52 substantially parallel to the central bar 34 and two end portion 54 at each end of the body portion 52 that each attach the body portion 52 to the central bar 34. Preferably, the two end portions 54 are substantially perpendicular to the central bar 34. However, it is to be understood that the end portions 54 can be attached to the central bar 34 at other angles, and one skilled in the art would know how to attach the body portion 52 to the central bar 34. For example, the end portion 54 can be at an angle substantially 45° with respect to the central bar 34.

As shown in FIG. 4, the baffle 30 is located within the beater 28. A first end 44 of the baffle 30 is received in the drive shaft 56, and the second end 46 of the baffle 30 is received in an opening 49 in the beater 28. The ends 44 and 46 of the baffle 30 are not connected to the drive shaft 56 or the beater 28. Therefore, when the drive shaft 56 rotates the beater 28, the baffle 30 does not rotate and remains stationary with respect to the beater 28 and the freezing cylinder 22. As shown in FIG. 1, the baffle 30 extends substantially along an entire length of the beater 28.

Preferably, the beater 28 and the baffle 30 are made of stainless steel. However, the beater 28 and the baffle 30 can be made of other materials. For example, the beater 28 and the baffle 30 can be made of plastic.

When the beater 28 is installed in the frozen carbonated beverage apparatus 20, the helical member 32 is adjacent the wall of the freezing cylinder 22. As the beater 28 rotates about the axis X, the scraper blades 58 scrape against the wall 59 of the freezing cylinder 22 and remove any frozen carbonated beverage that forms on the wall of the freezing cylinder 22. Additionally, as the beater 28 rotates, the helical member 32 moves and mixes the frozen carbonated beverage within the freezing cylinder 22 to prevent the frozen carbonated beverage form freezing into a solid form.

As the beater 28 rotates, the frozen carbonated beverage may tend to move towards the axis X in the center of the beater 28. The stationary baffle 30 prevents the mass of the product from just rotating with the beater 28 and assists in blending and breaking up the frozen carbonated beverage. That is, the stationary baffle 30 breaks up the frozen carbonated beverage as it moves within the beater 28. This prevents the frozen carbonated beverage from simply collecting along the axis X and possibly freezing with the center of the beater 28, improving consistency of the blended product.

Although the frozen carbonated beverage apparatus 20 is described as being used with a low Brix frozen carbonated beverage, it is to be understood that the frozen carbonated beverage apparatus 20 can be used with other frozen products, including frozen carbonated beverages having a high sugar content. The low Brix frozen carbonated beverage can also be a diet frozen carbonated beverage.

The foregoing description is exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention.

What is claimed is:

1. A frozen carbonated beverage apparatus comprising:
a freezing cylinder;
a beater moveable within the freezing cylinder; and
a baffle stationary with respect to the beater and the freezing cylinder, wherein the baffle includes an end portion received in a drive shaft that rotates the beater, a central bar and at least one arm spaced from the central bar, wherein a first end and an opposing second end of the at least one arm are attached to the central bar, and the at least one arm extends substantially along an entire length of the central bar.

2. A frozen carbonated beverage apparatus comprising:
a freezing cylinder;
a beater moveable within the freezing cylinder, wherein the beater includes a substantially helical member that is supported by a support member, the support member comprising a portion that is at least substantially semicircular in shape; and
a baffle stationary with respect to the beater and the freezing cylinder, wherein the baffle includes an end portion received in a drive shaft that rotates the beater.

3. The apparatus as recited in claim 2 further including an inlet and an outlet, wherein a fluid enters the freezing cylinder through the inlet and the fluid exits the freezing cylinder through the outlet.

4. The apparatus as recited in claim 3 wherein the fluid enters the inlet of the freezing cylinder as a carbonated liquid solution and exits the outlet of the freezing cylinder as a frozen carbonated beverage.

5. The apparatus as recited in claim 3 further including a carbon dioxide inlet, wherein carbon dioxide enters the freezing cylinder through the carbon dioxide inlet and mixes with the fluid.

6. The apparatus as recited in claim 2 wherein the beater is rotatable about an axis, and the baffle is disposed within the beater along the axis.

7. The apparatus as recited in claim 2 wherein the support member further includes at least one bar.

8. The apparatus as recited in claim 2 wherein the beater further includes a scraper blade and the freezing cylinder includes an inner wall, and the scraper blade scrapes the inner wall of the freezing cylinder.

9. The apparatus as recited in claim 2 wherein the beater and the baffle are made of plastic.

10. The apparatus as recited in claim 2 wherein the beater and the baffle are made of stainless steel.

11. The apparatus as recited in claim 2 wherein the at least one arm comprises three arms.

12. The apparatus as recited in claim 2 wherein the baffle includes an opposing end portion received in an opening in the beater.

13. The apparatus as recited in claim 2 wherein the baffle extends along substantially an entire length of the beater.

14. The apparatus as recited in claim 2 wherein the baffle is not connected to the drive shaft.

15. The apparatus as recited in claim 2 wherein the at least one arm include a main portion, a first extension and a second extension, wherein the first extension and the second extension are substantially perpendicular to the main portion, and the first extension includes the first end and the second extension includes the opposing second end.

16. An attachment for a frozen carbonated beverage apparatus, the attachment comprising:
   a beater moveable about an axis, wherein the beater includes a substantially helical member that is supported by a support member, the support member comprising a portion that is at least substantially semi-circular in shape; and
   a baffle stationary with respect to the beater, wherein the baffle is disposed along the axis and within the beater, and the baffle includes a central bar and at least one arm spaced from the central bar, and a first end and an opposing second end of the at least one arm are attached to the central bar.

17. The attachment as recited in claim 16 wherein the beater and the baffle are disposed in a freezing cylinder.

18. The attachment as recited in claim 17 wherein the beater further includes a scraper blade that scrapes an inner wall of the freezing cylinder.

19. The apparatus as recited in claim 16 wherein the baffle includes an end portion received in a drive shaft that rotates the beater.

20. A method of preparing a frozen carbonated beverage, the method comprising the steps of:
   adding a fluid to a freezing cylinder;
   freezing the fluid;
   rotating a beater within a freezing cylinder with a drive shaft, wherein the beater includes a substantially helical member that is supported by a support member, the support member comprising a portion that is at least substantially semi-circular in shape;
   moving the fluid towards a stationary baffle disposed within the beater; and
   contacting the fluid against the stationary baffle, wherein the stationary baffle includes an end portion received in the drive shaft, a central bar and at least one arm spaced from the central bar, and a first end and an opposing second end of the at least one arm are attached to the central bar.

21. The method as recited in claim 20 wherein the step of moving the beater includes moving the beater about an axis, and the stationary baffle is disposed along the axis.

22. A frozen carbonated beverage apparatus comprising:
   a freezing cylinder;
   a beater moveable within the freezing cylinder, wherein the beater includes a substantially helical member that is supported by a support member, the support member comprising a portion that is at least substantially semi-circular in shape; and
   a baffle stationary with respect to the beater and the freezing cylinder, wherein the baffle includes a central bar and at least one arm spaced from the central bar, and a first end and an opposing second end of the at least one arm are attached to the central bar.

23. The apparatus as recited in claim 22 wherein the at least one arm comprises three arms.

* * * * *